United States Patent

Pearson et al.

[11] Patent Number: 5,950,765
[45] Date of Patent: Sep. 14, 1999

[54] TWO STAGE MOTORIZED ACTUATOR

[75] Inventors: James E. Pearson, Downers Grove; Dennis R. Carls, deceased, late of Geneva, both of Ill., by Patricia J. Carls, legal representative

[73] Assignee: Eaton Corporation, Cleveland, Ohio

[21] Appl. No.: 09/030,723

[22] Filed: Feb. 25, 1998

[51] Int. Cl.[6] ............................... F03G 1/00; F16K 31/53
[52] U.S. Cl. .................... 185/40 R; 251/69; 251/129.11; 251/249; 251/249.5
[58] Field of Search ............................. 185/40 R; 251/69, 251/129.11, 249, 249.5

[56] References Cited

U.S. PATENT DOCUMENTS

| 1,394,907 | 10/1921 | Jones | 185/40 R |
| 4,203,573 | 5/1980 | Boss | 185/40 R X |
| 5,727,653 | 3/1998 | Grossnebacher et al. | 185/40 R |

*Primary Examiner*—Allan D. Herrmann
*Attorney, Agent, or Firm*—Roger A. Johnston

[57] ABSTRACT

A two stage motorized servo-actuator having a worm driven high reduction gear train providing a rotary output. The motor shaft has a worm and co-axially therewith, a beveled pinion. The motor worm is continuously engaged with a first stage gear. The first stage gear has an input sector gear disposed co-axially and rotatable therewith. The input sector gear intermittently engages an output gear. The output gear has a beveled output sector gear disposed co-axially and rotatably therewith. Upon disengagement of the input sector gear with the output gear, the beveled pinion engages the beveled output sector gear to drive the output gear directly. Once the input sector gear is disengaged from the output gear, a return spring on the output gear can reverse drive the motor through the beveled pinion to return the output gear to a desired position in the event of motor failure in operation.

13 Claims, 1 Drawing Sheet

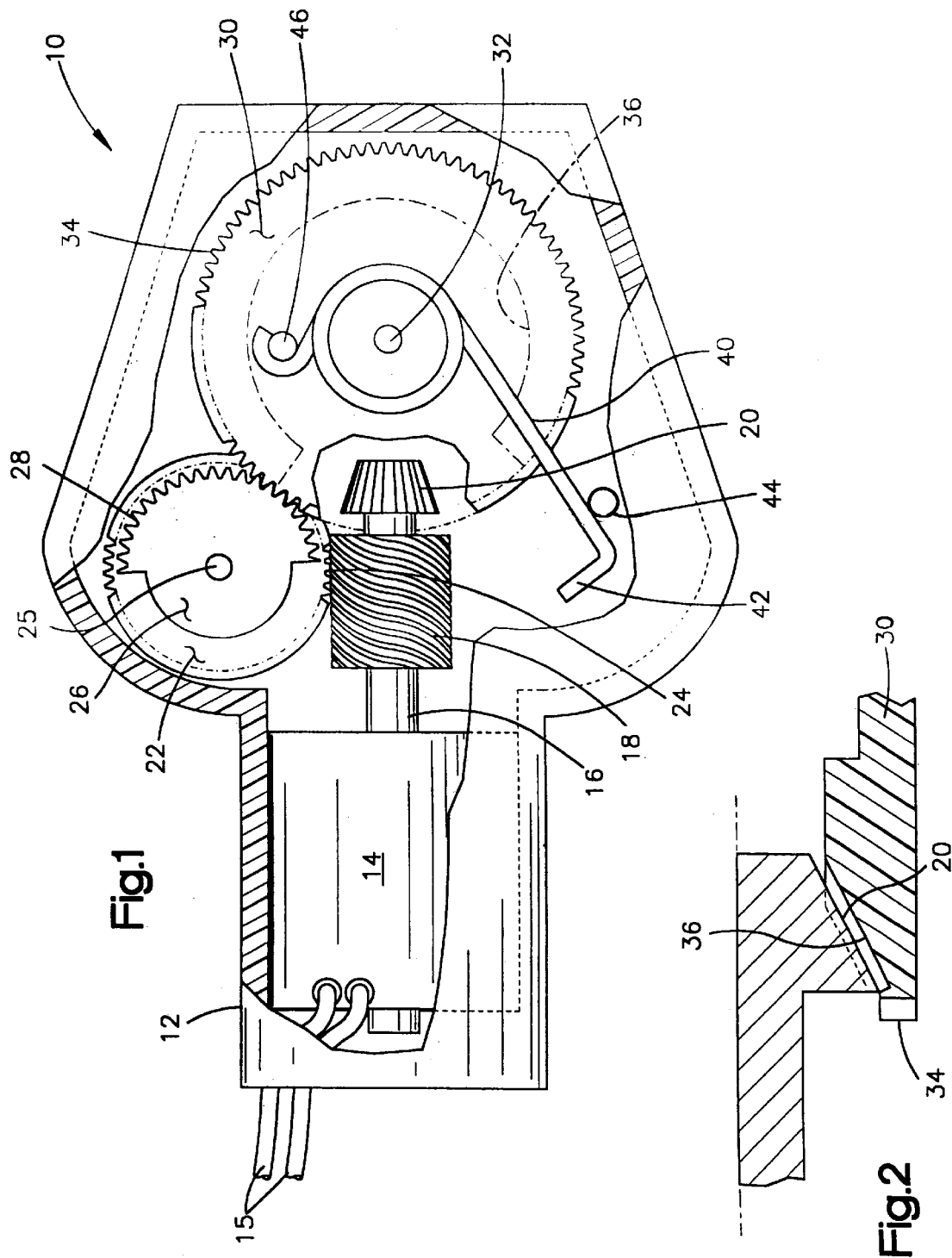

TWO STAGE MOTORIZED ACTUATOR

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE DISCLOSURE

The present invention relates to servo-actuators for providing mechanical output such as rotation of a shaft in response to energization of an electric drive motor. The invention relates particularly to rotary actuators driven by a low voltage motor such as a small relatively high RPM motor of sub-fractional horsepower operating from a vehicle on-board power supply, typically in the range 12–24 volts. Electrically operated servo-actuators have been found desired for various on-board vehicle applications.

In one application it has become desired to operate a vehicle engine air throttle valve, typically of the butterfly type, by an electrically operated servo-actuator in place of a mechanical linkage connected to a throttle pedal moved directly by the vehicle operator. This type of arrangement is known as a "drive-by-wire" system inasmuch as the vehicle throttle pedal employs an electrical transducer which provides an electrical signal to an electronic controller which provides an output driver signal to a motorized actuator for moving the throttle butterfly. Such arrangements have the advantage that the electronic controller can override the throttle pedal signal from the vehicle operator in the event that vehicle operation is jeopardized or the operator called-for engine operation would result in a prohibitive amount of exhaust emissions or loss of wheel traction. In addition, electrically operating the throttle directly with a motorized actuator eliminates the need for a separate throttle actuator for cruise control mode of operation of the vehicle.

In providing an electrically operated throttle servo-actuator for motor vehicle applications, it is necessary to provide for automatic throttle return or closing. In particular, it is desired to provide for automatic or self return of the servo-actuator to an initial reduced opening or closed throttle position in the event of failure of the servo-actuator motor.

Typically, the throttle servo-actuator may be spring biased to a return or closed throttle position in the event of electric motor failure. However, in order to provide sufficient torque to reverse drive the entire actuator mechanism, for example, a gear reduction train, a significant amount of force is required by the return spring to overcome the friction of the actuator drive mechanism. This results in additional output power requirements for the servo-actuator in order to deflect or wind up the return spring in addition to moving the throttle.

In another application, it has been desired to electrically operate a valve for controlling flow of heated engine coolant to the heater core for heating the air in a vehicle passenger compartment. In such an application, it is desired that a numerically high ratio of speed reduction be employed for precise or fine control of the valve butterfly position. In order to accomplish such control, a substantial torque output is required from a relatively small motor drawing low current i.e., about 10 amperes or less when operating from a supply of 12 to 24 volts. This torque requirement makes a worm drive the preferred arrangement for providing high reduction at a minimum number of gears and minimum cost. However, in the event of motor failure during operation, it is required that the valve be biased to the full open position to provide maximum heating of the passenger compartment in order to protect the vehicle occupants from exposure to extreme cold.

Where a worm driven gear train is provided for an application for rotary actuation, it is virtually impossible to reverse drive the gear train with a spring because torque applied to the driven gear meshing with the worm will not reverse drive the worm for any practical helical angle of the worm suitable for providing the desired gear reduction.

Accordingly, it has been desired to provide a way or means of utilizing a motorized worm for driving a gear train in a servo-actuator to provide a rotary output such as for controlling the opening and closing of the vehicle throttle or heater core valve in response to electrical control signals and to provide for a release and self return to a desired position in the event of failure of the drive motor.

BRIEF SUMMARY OF THE INVENTION

The present invention provides a motorized servo-actuator which employs a worm driven gear train to provide rotation of an output shaft and provides for automatic self return of the output to a desired or initial position in the event of motor failure during operating.

The present invention provides a motorized worm driven actuator for rotating an output shaft which is operated by a relatively high RPM sub-fractional horsepower motor operating from a relatively low voltage supply such as found on board a motor vehicle. The present invention provides a high RPM sub-fractional horsepower motor operable from a low voltage on-board vehicle power supply which has a spring-loaded output gear which has a sector gear thereon driven by a pinion on the same shaft as the worm. The output gear is engaged by an input sector gear attached to a first stage reduction gear which is continuously driven by the motor worm. From an initial position, the first stage gear rotates the input sector gear until the sector gear is disengaged from the output gear whereupon the pinion engages the output sector gear to continue rotation of the actuator by the pinion instead of the worm.

The choice of input sector gear and output sector gear enables the utilization of the high reduction of the worm for an initial movement of the output gear, whereupon the drive changes to the pinion connection to the output sector gear. The pinion driven output gear is readily returnable by a suitable torsion spring, thus providing a self return mode of operation in the event of motor failure.

In the presently preferred practice the pinion gear and output gear are beveled.

BRIEF DESCRIPTION OF THE DRAWINGS

FIG. 1 is a plan view of the servo-actuator of the present invention with the casing broken away to show the interior; and, FIG. 2 is a section view taken along section-indicating lines 2—2 of FIG. 1.

DETAILED DESCRIPTION OF THE PREFERRED EMBODIMENT

Referring to FIG. 1, the actuator assembly of the present invention is indicated generally at 10 and has a case or housing 12 having disposed therein a drive motor 14 which is preferably of the low voltage, relatively high RPM sub-fractional horsepower type and capable of operating from a low voltage power supply on the order of 12 to 24 volts. Motor 14 has a pair of electrical leads 15 attached thereto, which are accessible from the exterior of housing 12 for connection to a controller (not shown). The output shaft 16 of motor 14 has mounted thereon a drive worm 18 and co-axially therewith a beveled drive pinion 20 both of which are secured to shaft 16 for rotation therewith.

A first stage reduction gear 22 has a plurality of teeth 24 disposed about the entire periphery thereof but with only a few of the teeth illustrated in the drawings. The first stage gear 22 is journalled on the housing 12 about pin or shaft 25, for rotation thereon with the teeth 24 in continuous engagement with the drive worm 18.

First stage gear 22 has disposed for rotation therewith in coaxial arrangement, an input sector gear 26 which has teeth 28 provided thereon about a desired arcuate segment of the periphery thereof. The sector gear 26 may be formed integrally with the gear 22 as one piece if desired.

An output gear 30 is journalled on the housing about pin or axle 32; and, output gear 30 has a plurality of teeth 34 formed about the entire periphery thereof.

Output gear 30 has disposed co-axially therewith an arcuate sector of beveled teeth indicated in dashed outline by reference numeral 36. The beveled output sector gear 36 is adapted to engage the pinion 20 when gear 30 is rotated to a position either clockwise or counter-clockwise from the position shown in FIG. 1 to the dashed outline indicating the end of the teeth of output sector gear 32.

Referring to FIG. 2, the engagement of the pinion teeth 20 with the beveled sector gear 36 is shown in solid outline and in greater detail.

Referring to FIG. 1, a torsion spring 40 has an end 42 thereof registered against a stop comprising pin 44 provided in the housing; and, the remaining end of the spring 40 is hooked about a pin 46 provided on the face of gear 30 and extending axially therefrom. The torsion spring 40 is arranged in the embodiment of FIG. 1 such that upon counter-clockwise rotation of gear 30, the spring is wound to provide increased torque in a clockwise direction on the gear 30.

In operation, upon initial energization, with the output gear in the position shown in FIG. 1, worm 18 rotates first stage gear 22 and input sector gear 28 which engages teeth 34 and causes the output gear 30 to be rotated to a position where pinion 20 engages beveled sector gear teeth 36; and, the input sector gear teeth 28 are thereupon disengaged from teeth 34 on the output gear. Upon continued rotation of the motor shaft, the pinion 20 drives the output sector gear 36 directly and input sector gear 28 does not engage teeth 34 and does not drive gear 30.

In a vehicle throttle application the throttle valve (not shown) would be connected to the output gear 30, and the amount of rotation of the output sector gear 30 would not be sufficient to cause the vehicle throttle to be opened significantly; and, thereafter in the event of motor failure, the return spring 40 would return the gear 30 to the initial position of engagement of the beveled sector gear 36 with the throttle returning to the initial position or closed throttle position by virtue of the disengagement of teeth 34 from the input sector gear 28. It will be understood that when input sector gear teeth 28 are not engaged in the output gear teeth 34, the spring has adequate torque to rotate the gear 30 and motor pinion and the motor shaft 16.

The present invention thus provides a low cost, reliable and simple motorized servo-actuator which employs a worm drive and provides an overall high gear reduction in a small compact lightweight and relatively low cost assembly.

The present invention thus provides a unique and novel electrically operated two-stage servo-actuator with a worm drive which disengages the worm drive after partial rotation and thereafter drives the output directly with a pinion thereby enabling a torsional return spring to freely return the actuator to its initial position in the event of motor failure.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

It is claimed:

1. A worm drive motorized actuator capable of self-returning to an initial position upon motor failure comprising:
   (a) a motor having an output shaft with a drive worm and a pinion gear thereon;
   (b) a first stage gear engaged and driven by said drive worm, said first stage gear including an input sector gear disposed co-axially and rotatable therewith;
   (c) an output gear disposed to be engaged by said input sector gear, said output gear including an output sector gear disposed co-axially therewith, said output sector gear disposed to be engaged by said pinion, when said input sector gear is disengaged from said output gear; and,
   (d) spring means operable to rotate said output gear to an initial position when said input sector gear is disengaged from said output gear and said motor is de-energized.

2. The actuator defined in claim 1, wherein said input sector gear and said output gears are spur gears.

3. The actuator defined in claim 1, wherein said pinion and output sector gear is beveled.

4. A two-stage motorized actuator comprising:
   (a) a motor having an output shaft with a drive worm thereon and also a pinion disposed co-axially with said drive worm;
   (b) a first stage gear disposed to be continuously engaged by said drive worm and an input sector gear disposed co-axially with and rotatable with said first stage gear;
   (c) an output gear disposed to be driven intermittently by said input sector gear and an output sector gear disposed co-axially and rotatable with said output gear, said output sector gear disposed to be intermittently driven by said pinion, wherein upon energization of said motor, said first stage gear rotates said input sector gear to engage said output gear and rotates said output gear until said pinion engages said output sector gear, whereupon said input sector gear is disengaged from said output gear; and,
   (d) torsion spring means operable upon de-energization of said motor to cause said output sector gear to rotate said output gear said pinion and motor shaft and return said output gear to an initial position.

5. The actuator defined in claim 4, wherein said output sector gear comprises a beveled gear; and, said pinion is beveled.

6. The actuator defined in claim 4, wherein said output gear and said output sector gear are formed integrally as one piece.

7. The actuator defined in claim 4, wherein said first stage gear and said input sector gear are formed integrally as one piece.

8. A method of operating a two-stage motor driven servo-actuator comprising:

(a) disposing a worm and a pinion co-axially on a motor shaft for rotation therewith;

(b) engaging and driving a first stage gear with said worm;

(c) disposing an input sector gear for rotation with said first stage gear;

(d) engaging and driving an output gear with said input sector gear;

(e) disposing an output sector gear for rotation with said output gear;

(f) disengaging said input sector gear from said output gear; and, engaging said output sector gear with said pinion and driving said output sector gear directly with said pinion; and, (e) biasing said output gear in a reverse direction and rotating said output gear to an initial position in the event of driving failure of the motor.

9. The method defined in claim 8, wherein said step of engaging and driving said first stage gear with said worm includes continuously engaging said worm with said first stage gear.

10. The method defined in claim 8, wherein said step of disposing an output sector gear includes beveling said output sector gear.

11. The method defined in claim 8, wherein said step of disposing a pinion gear includes beveling said pinion.

12. The method defined in claim 8, wherein said step of disposing an input sector gear includes forming said input sector gear integrally with said first stage gear.

13. The method defined in claim 8, wherein said step of disposing an output sector gear includes forming said output sector gear integrally with said output gear.

* * * * *